United States Patent
Zaidi et al.

(10) Patent No.: US 10,270,544 B2
(45) Date of Patent: Apr. 23, 2019

(54) USER EQUIPMENT AND A METHOD FOR LINK QUALITY DETERMINATION

(71) Applicant: Telefonaktiebolaget LM Ericsson (publ), Stockholm (SE)

(72) Inventors: Ali Zaidi, Järfälla (SE); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/037,928

(22) PCT Filed: Mar. 8, 2016

(86) PCT No.: PCT/EP2016/054914
§ 371 (c)(1),
(2) Date: May 19, 2016

(87) PCT Pub. No.: WO2016/155989
PCT Pub. Date: Oct. 6, 2016

(65) Prior Publication Data
US 2017/0126338 A1 May 4, 2017

Related U.S. Application Data

(60) Provisional application No. 62/142,251, filed on Apr. 2, 2015.

(51) Int. Cl.
*H04B 17/318* (2015.01)
*H04L 5/00* (2006.01)
(Continued)

(52) U.S. Cl.
CPC ......... *H04B 17/318* (2015.01); *H04B 17/309* (2015.01); *H04L 1/0035* (2013.01);
(Continued)

(58) Field of Classification Search
CPC ... H04B 17/318; H04B 17/309; H04L 5/0051; H04L 1/0035; H04W 76/023; H04W 8/005; H04W 24/08; H04W 76/14
See application file for complete search history.

(56) References Cited

U.S. PATENT DOCUMENTS

2013/0322276 A1 12/2013 Pelletier et al.
2014/0185495 A1 7/2014 Kuchibhotla et al.
(Continued)

FOREIGN PATENT DOCUMENTS

JP 2014532372 A 12/2014
JP 2016527845 A 9/2016
(Continued)

OTHER PUBLICATIONS

"D2D Link Measurements Definitions", 3GPP TSG RAN WG1 Meeting #81; R1-153350; Fukuoka, Japan, May 2015, pp. 1-3.

*Primary Examiner* — Kwang B Yao
*Assistant Examiner* — Moo Jeong
(74) *Attorney, Agent, or Firm* — Murphy, Bilak & Homiller, PLLC (57) ABSTRACT

The disclosed embodiments relates to a method performed by an D2D capable UE (800) and also relates to the D2D capable UE (800) for determining link quality of a D2D signal or D2D channel. The method includes receiving (710) a D2D signal or channel transmitted from another D2D capable UE; if detection (720) of the D2D signal or channel is determined to be successful; identifying (730) the identity of the other D2D capable UE; measuring (740) received signal power on resources of the D2D signal or channel; measuring (750) signal strength indicator on resources of the D2D signal or channel or on other resources different from the resources of the D2D signal or channel; and determining
(Continued)

(760) link quality based on the measured received signal power and based on the measured signal strength indicator.

9 Claims, 7 Drawing Sheets

(51) Int. Cl.
*H04W 76/14* (2018.01)
*H04L 1/00* (2006.01)
*H04B 17/309* (2015.01)
*H04W 8/00* (2009.01)
*H04W 24/08* (2009.01)

(52) U.S. Cl.
CPC ........... *H04L 5/0051* (2013.01); *H04W 8/005* (2013.01); *H04W 24/08* (2013.01); *H04W 76/14* (2018.02)

(56) References Cited

U.S. PATENT DOCUMENTS

| | | |
|---|---|---|
| 2014/0206286 A1 | 7/2014 | Palin et al. |
| 2014/0219095 A1 | 8/2014 | Lim et al. |
| 2015/0264592 A1* | 9/2015 | Novlan ............... H04L 27/2601 370/252 |
| 2016/0135240 A1* | 5/2016 | Yoon ................... H04W 76/023 370/329 |
| 2016/0192334 A1 | 6/2016 | Takeda et al. |
| 2016/0242061 A1* | 8/2016 | Harada ................. H04L 5/0098 |
| 2016/0309355 A1* | 10/2016 | Seo ....................... H04W 8/005 |

FOREIGN PATENT DOCUMENTS

| | | |
|---|---|---|
| WO | 2013055271 A1 | 4/2013 |
| WO | 2014104627 A1 | 7/2014 |
| WO | 2014107091 A1 | 7/2014 |
| WO | 2015019825 A1 | 2/2015 |

* cited by examiner

USER EQUIPMENT AND A METHOD FOR LINK QUALITY DETERMINATION

TECHNICAL FIELD

The present disclosure relates to a user equipment or device and a method performed by the user equipment or device for determining a quality of a device-to-device direct link communication.

BACKGROUND

Communication devices such as wireless device are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In $3^{rd}$ Generation Partnership Project (3GPP) Long Term Evolution (LTE), base stations, which may be referred to as eNodeBs or even eNBs, may be directly connected to one or more core networks.

3GPP LTE radio access standard has been developed in order to support high bitrates and low latency both for uplink and downlink traffic. All data transmission is in LTE controlled by the radio base station.

For mobility reasons where a UE in a LTE network performs e.g. a handover from a cell served by an eNB to another cell served by another eNB, the UE typically performs measurements on signals or channels. There are defined different types of parameters that a UE may measure. For example, in the LTE network, a UE may measure on reference signal: RSRP (Reference Signal Received Power) and RSRQ (Reference Signal Received Quality).

RSRP (Reference Signal Receive Power) is the average power of Resource Elements (RE) that carry cell specific Reference Signals (CRS) over the entire system bandwidth. RSRP is measured in the symbols carrying the reference signal. Its typical range is around −44 to −130 dBm. This measurement is used in Radio Resource Control (RRC) Idle/Connected, cell se-selection/selection, handover scenarios etc. Since a UE for RSRP measures only the reference power, this measure may be viewed as the strength of the wanted/desired signal. However, the RSRP does not give information about the signal/channel quality. In other words, RSRP provides the signal strength of the desired signal, not the quality of the signal. For quality of the signal information another parameter called 'RSRQ' is used.

RSRQ (Reference Signal Received Quality) is defined as (N×RSRP)/RSSI, where N is the number of Resource Blocks (RBs) over the measurement bandwidth. This is not the direct measurement. It is a kind of derived value from RSRP and RSSI (Received Signal Strength Indicator). By dividing RSRP by RSSI, it could give some information about interference as well in addition to the strength of the wanted/desired signal. The RSSI parameter represents the entire received power including the wanted power from the serving cell or serving eNB as well as all co-channel power and other sources of noise. Measuring RSRQ becomes important near the cell edge when decisions need to be made, regardless of absolute RSRP, to perform a handover to the next cell. It should be mentioned that RSRQ is used only during connected states. Intra- and inter-frequency absolute RSRQ accuracy varies from ±2.5 to ±4 dB, which is similar to the inter frequency relative RSRQ accuracy of ±3 to ±4 dB.

The RSSI is a parameter which provides information about total received wide-band power (measure in all symbols) including all interference and thermal noise. In other words, the RSSI is the total power a UE observes across the whole band. This includes the main signal and co-channel non-serving cell signal, adjacent channel interference and even the thermal noise within the specified band. This is the power of non-demodulated signal, so a UE may measure this power without any synchronization and demodulation. So in LTE RSRP provides information about signal strength and RSSI helps in determining interference and noise information. This is the reason RSRQ measurement and calculation is based on both RSRP and RSSI.

As mentioned above, the link quality (RSRQ) measurement aims at providing an indirect indication of the expected Signal to Interference Noise Ratio (SINR) for a given LTE cell. The RSRQ is a function of RSRP and RSSI as previously described. Both terms are determined/calculated based on the DownLink (DL) data channel Physical Downlink Shared Channel (PDSCH), since it is interesting for the measuring UE to obtain information about DL link quality. Since the position of CRS used for RSRP calculation and the LTE frame structure are known to the UE receiver either by specification or via broadcast system information, the UE receiver has no ambiguity in selecting the correct Resource Elements (REs) to be used for RSRP and RSSI measurements.

However, differently from the cellular case (LTE case above), a Device-to-Device (D2D) capable UE receiver is in general not aware of the position of reference signals and D2D data transmissions for RSRP and RSSI estimation. This is because, differently from DL from a eNB, D2D UE devices do not in general transmit regular signals such as CRS in D2D communications. Therefore, if the legacy procedures (i.e. from cellular network procedures) are applied directly to D2D, there is a risk to either calculate RSRP erroneously (due to lack of data transmission) or to include the incorrect interference contribution in the RSSI calculation.

A short technical description of D2D is presented below.

D2D communications (also defined as Proximity Service (ProSe) direct communication or sidelink communication or peer to peer communication, etc) as as an underlay to cellular networks have been proposed as a means to take advantage of the proximity of communicating devices (UEs) and at the same time to allow devices to operate in a controlled interference environment. It is suggested that such D2D communication shares the same spectrum as the cellular system, for example by reserving some of the cellular uplink resources for D2D purposes. Allocating dedicated spectrum for D2D purposes is a less likely alternative as spectrum is a scarce resource and (dynamic) sharing between the D2D services and cellular services is more flexible and provides higher spectrum efficiency.

The transmission mode when sending data during D2D communication may be either:

Unicast—a specific UE is the receiver

Multicast (may also be denoted group-cast)—a group of UEs are receivers

Broadcast—all UEs are receivers

With connectionless D2D communication, data can be sent from one device or UE to another device or UE without prior arrangement, thereby reducing the overhead and increasing the communication capacity which is crucial in emergency situations. The source device transmits data to one or more devices, without first ensuring that the recipients are available and ready to receive the data. Connectionless communication may be used for one-to-one or one-to-many communication, but it is particularly effective for multicast and broadcast transmissions and thus well-suited for broadcast and group communication.

When a D2D UE is in network coverage of a eNB, any D2D communication is controlled by the network node (such as the eNB). Since the radio resources in a cell (especially for the uplink resources) are shared between traditional cellular communication and D2D communication, the eNB should divide and assign the radio resources also in case of D2D communication, in case the UEs are in coverage. In 3GPP Release 12, the ProSe or D2D UE Information message has been introduced as part of the RRC protocol. This information message is used whenever the UE needs to inform the eNB about a need to ProSe communication or ProSe Discovery. For communication, the information message contains a list of ProSe destinations, and an index associated to each of these. In case of multicast communication a ProSe destination is a ProSe Layer 2 Group identity and for unicast communication it is a ProSe UE Identity. The index may be used as a 4 bit short reference to a given group or unicast destination, e.g. as used in the MAC Buffer Status Report when transmitting data to the destination.

Moreover, a given unicast traffic session between two UEs may use either a direct communication path or the infrastructure communication path. When using the direct communication path, the data is transmitted directly between the UEs, using D2D communication. On the other hand, when using the infrastructure communication path, the data is instead transmitted via the network nodes. The latter case is only available when both UEs are in coverage by the network node.

A service continuity switch is the procedure to move a user traffic session from the direct communication D2D path to the infrastructure communication path, or vice versa. With "infrastructure communication path" we mean that the packets use the non-D2D, legacy, physical (uplink and downlink) channels and also that the packets are transmitted over a bearer, which is a tunnel between the UE and the Packet Data Network GateWay (PDN GW) node.

Figure 1:
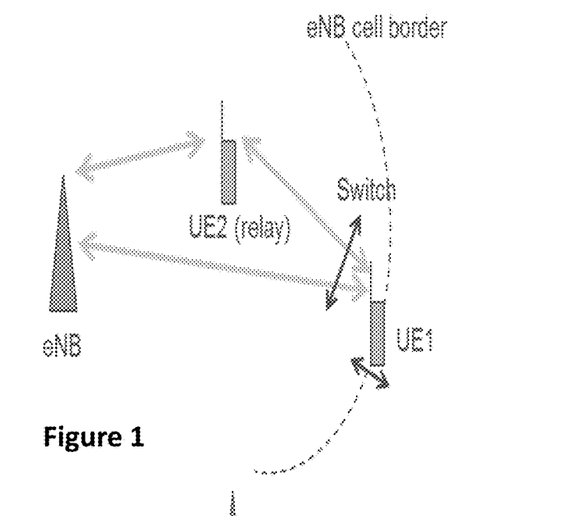
FIG. 1 is a scenario wherein embodiments herein may be applied.

Service continuity between infrastructure and ProSe Direct Communication paths maybe divided into two different scenarios:

Scenario 1 ("One UE") is shown in FIG. 1 wherein a user or UE traffic session is maintained even when a UE goes between in coverage and out of coverage. In this scenario, the mobility is limited to one UE (UE1), and the other UE (UE2) acts as the relay between the remote UE and NW (eNB). The switch and eNB cell boarder is also shown.

Figure 2:
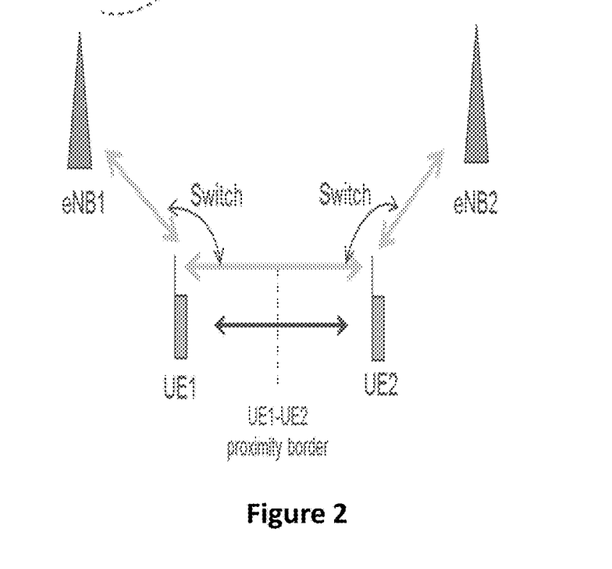
FIG. 2 is another scenario wherein embodiments herein may be applied.

"Scenario 2 ("Two UEs") is shown in FIG. 2 where two switches are shown: A switch into ProSe D2D communication path between two in-coverage UEs when they come within proximity of each other. In this scenario, the mobility of both UEs (UE1 and UE2) would be considered. Two eNBs, eNB1 and eNB2 are shown where here, UE1 is considered served by eNB1 and UE2 served by eNB2. Hence a switch is performed from the infrastructure mode to the direct D2D mode i.e. between the UEs.

Radio-proximity related measurements between D2D devices may be exploited in the above scenarios for determining the switching of the path e.g. from the infrastructure mode to a direct D2D mode. However, as explained before, differently from the cellular case (LTE), a D2D or ProSe capable UE receiver is in general not aware of the position of reference signals and D2D data transmissions for RSRP and RSSI estimation. This is because, differently from DL from a eNB, D2D UE devices do not in general transmit regular signals such as CRS in D2D communications. Therefore, if the legacy measurement procedures (i.e. from cellular network procedures) are applied directly to D2D, there is a risk to either determine or calculate RSRP erroneously (due to lack of data transmission) or to include the incorrect interference contribution in the RSSI calculation or determination. This would affect the performance of D2D communications in the different scenarios described before.

SUMMARY

It is an object of embodiments herein to solve the above problems by providing a method and a UE or device for determining quality of device-to-device direct link communication for improving measurement accuracy in D2D direct communications.

According to the present disclosure, link quality measurements tailored for D2D are defined.

According to an aspect of embodiments herein, there is provided a method in a D2D capable UE for determining link quality of a D2D signal/channel, the method comprising: receiving a signal/channel from another D2D UE; performing signal/channel detection on the received signal/channel; identifying the identity of the transmitter D2D UE if detection is successful; measuring/estimating received signal power on resources of the signal/channel; measuring/estimating signal strength indicator on resources of the signal/channel or on other resources. The signal strength indicator may be measured/estimated on resources associated to the successfully detected signal/channel for a transmitted UE of interest e.g. discovery. The signal strength indicator may instead be measured/estimated on other resources for a signal/channel that are different from the resources where the received signal power is measured/estimated; and determining link quality based on the measured/estimated received signal power and also based on the measured/estimated signal strength indicator.

According to another aspect of embodiments herein, there is provided a D2D capable UE for determining a processing circuit/module or processor; a receiver circuit/module which may be part of a transceiver circuit/module; a transmitter circuit/module (which may be part of the transceiver); and a memory. The receiver circuit/module or the transceiver is configured to receive a D2D signal/channel from another D2D device (UE). The processing circuit/module is configured to perform detection of the received signal/channel and also configured to determine whether or not the detection is successful. This may be done by performing a CRC. If the CRC is successful the processing circuit/module is configured to identify the identity of the transmitter D2D device (UE) that transmitted the signal/channel. The processing circuit/module is further configured to measure or estimate a signal strength indicator on resources of the signal/channel or on other resources. The processing circuit/module is further configured to determine a link quality of the received signal/channel based on the estimated received signal power and also based on the estimated signal strength indicator.

An advantage with embodiments herein is that the measurements are not performed on cell specific reference signals as is the case in LTE. Another advantage is that the D2D link quality measurement accuracy is improved as compared to direct application of legacy measurements definitions.

BRIEF DESCRIPTION OF THE DRAWINGS

Examples of embodiments herein are described in more detail with reference to attached drawings in which.

DETAILED DESCRIPTION

In the following, a detailed description of the exemplary embodiments is described in conjunction with the drawings, in several scenarios to enable easier understanding of the solution(s) described herein.

Figure 3:
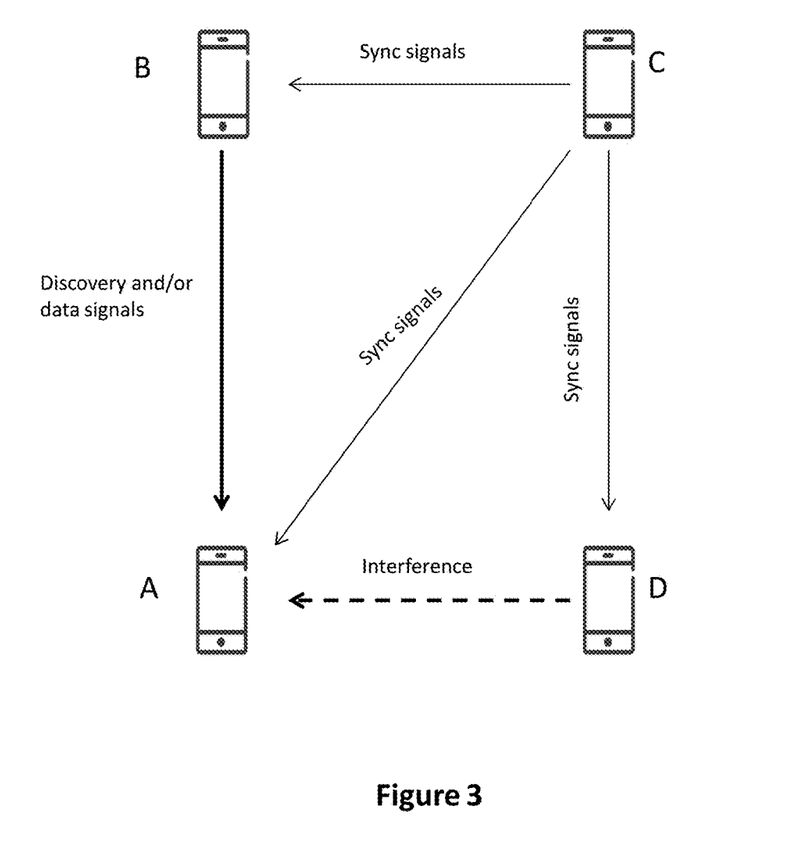
FIG. 3 shows yet another scenario wherein embodiments herein may be applied.

FIG. 3 depicts an exemplary scenario wherein embodiments herein may be applied. Four devices or D2D UEs are shown A, B, C and D. There are three different types of D2D transmissions occurring within the coverage area of the devices in proximity: i) Device C is shown broadcasting synchronization (sync) signals that aid maintaining synchronization to the devices in proximity; ii) Device B is shown transmitting discovery and/or data signals targeting Device A; and iii) device D is shown transmitting discovery and/or data signals which here is considered to be interference towards Device A.

In order to determine the link quality experienced at Device A at least two parameters are needed, which include the average power of the received signal of interest and the received signal strength indicator as will now be described. For the average power of received signal, Device A starts by performing a detection of a desired or wanted D2D signal e.g. a sync signal and/or discovery signal and/or data signal and/or a scheduling assignment (SA) and if the detection is successful, Device A identifies the identity of the D2D UE that transmitted the wanted signal and performs measurement on the wanted signal. This may be compared to a RSRP measurement. This measure refers to the average power received from the UE of interest. Detection is considered successful if e.g. a Cyclic Redundancy Check (CRC) is successful. So assuming the wanted signal (discovery and/or data) is the one transmitted from Device B, Device A performs detection of that signal followed by a CRC of that signal and if the CRC is successful, the identity of Device B is identified and the average power of the received signal is estimated.

Device A may use the identity of Device B to transmit dedicated signals to Device B (discovery, data or SA) or to use Device B as a relay device.

According to an exemplary embodiment, the measurement may be performed on a reference signal associated with the detected signal. In another example, Device A may estimate the power for a certain transmission e.g. a SA based on a measurement performed on another transmission e.g. a discovery signal. In this case, the estimated power may be obtained from the measured power after a rescaling step, where the rescaling may correspond to the bandwidth ratio between the measured channel/signal and the channel/signal for which the power is estimated. The reason is that UEs may operate on a constant power constraint and the average received power on a given resource is a function of the used bandwidth of a given signal/channel.

As mentioned before, a received signal strength indicator is also needed for determining the link quality. The signal strength indicator measurement aims at measurement of useful signal plus interference for a channel/signal of interest.

According to an exemplary embodiment, the signal strength indicator may be measured for a channel/signal over at least a subset of resources associated to a successfully detected channel transmission for the UE of interest.

An advantage with such exemplary embodiment is it that it provides an accurate estimation of the signal strength indicator. The receiver (e.g. Device A) may assume that both the useful signal and the interference are present in the received signal strength indicator measurement.

According to another exemplary embodiment, the signal strength indicator may be measured on a set of resources that may be known to the device (Device A) e.g. it may be a pool of resources for a channel/signal of interest (Scheduling Assignment (SA), data, discovery, etc.).

Figure 4:
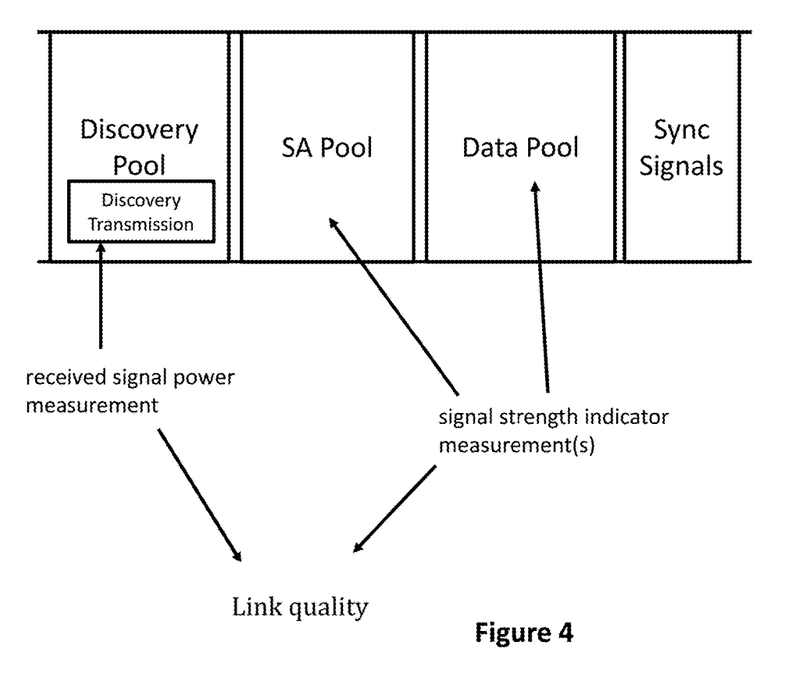
FIG. 4 is a schematic view of resource partitioning using pools of resources over which measurements may be performed by a D2D UE.

FIG. 4 illustrates an example of resource partitioning using pools of resources, each pool dedicated to a type of resources as shown e.g. Discovery, SA and Data. A partition for sync signals is also shown. As depicted, measurements as described above may be performed on such resources. As shown, for the measurement of the received signal power, measurement may be performed on a signal of interest which in this example is a discovery transmission transmitted on a discovery resource pool. For the measurement of the signal strength indicator, measurements may be performed on the set of SA resource pool and/or on the set of data resource pool as shown.

Hence in this example, Device A detects a discovery signal/channel and if the detection is successful (e.g. if the CRC check is successful), Device A identifies the identity of the D2D device that transmitted the discovery signal or channel and Device A may perform measurement on the discovery transmissions(s) transmitted on a discovery resource pool in order to estimate the received signal power. Device A may further perform measurement(s) on the transmissions transmitted on a SA pool and/or a data pool to estimate the signal strength indicator. Based on these estimates the link quality may be determined as link quality=$N_{PRB}$×(estimated received signal power/estimated signal strength indicator), where $N_{PRB}$ is the number of physical resource blocks over the measurement bandwidth used for D2D communication.

Figure 5:
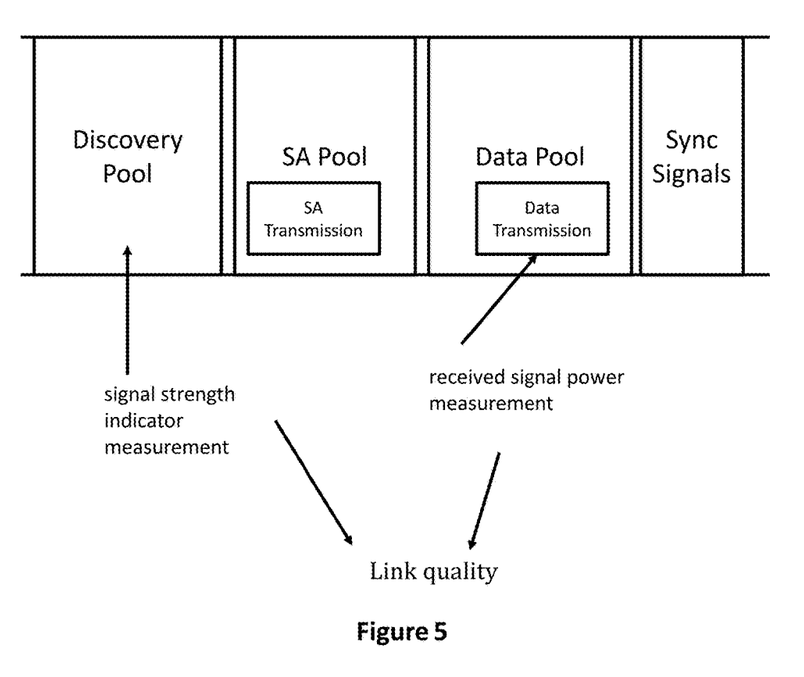
FIG. 5 is another schematic view of resource partitioning using pools of resources over which measurements may be performed by the DD UE.

It should be mentioned that the received signal power may be estimated based on transmission received on resources of the data pool or resources of the SA pool, whereas the signal strength indicator may be estimated on transmission received on resources of the Discovery pool. This is shown in FIG. 5. As depicted the signal quality is determined. In FIG. 5 it is assumed that the Device A measures the signal strength indicator on a set of resources preconfigured in Device A. E.g. it may be the pool of resources where a channel/signal of interest is transmitted which is here a discovery signal. Device A estimates the received signal power on a data transmission and then determines the link quality as described above in relation to FIG. 4.

An advantage with embodiments herein is that the measurements are not performed on cell specific reference signals as is the case in LTE. Another advantage is that the D2D link quality measurement accuracy is improved as compared to direct application of legacy measurements definitions.

Figure 6:
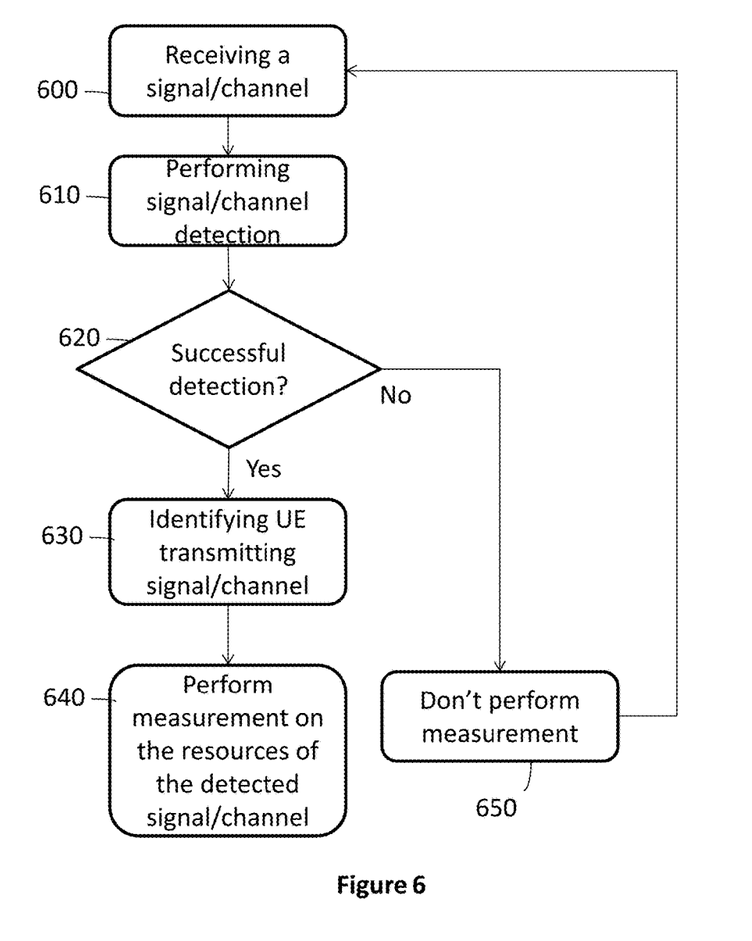
FIG. 6 is a flowchart depicting some embodiments of a method performed by the D2D UE.

Referring to FIG. 6 there is illustrated an example of a procedure or method performed by Device A for performing received signal power measurement according to an exemplary embodiment.

As shown, the method starts by Device A receiving a D2D signal/channel of interest e.g. a discovery signal or a data signal of a scheduling assignment (SA) 600.

The method further comprises performing signal/channel detection 610 and determining whether the detection is successful (e.g. by performing CRC) 620 and that being the case the identity of the D2D UE (or Device) transmitting the signal/channel is identified 630. Thereafter, Device A performs a received signal power measurement on resources of the successfully detected signal/channel 640. If the detection was unsuccessful e.g. the CRC fails, Device A refrains from performing measurement(s) 650 and instead listens for other signal/channel and tries again. As previously described Device A may measure the signal strength indicator on a set of resources belonging to discovery, data or SA.

Based on these estimates/measures the link quality may be determined as link quality=$N_{PRB}$×(estimated received signal power/estimated signal strength indicator). Where $N_{PRB}$ is the number of physical resource blocks over the measurement bandwidth used for D2D communication.

The identity of D2D transmitter UE that transmitted the signal/channel may be used to transmit dedicate signalling to the transmitter e.g. discovery, data or SA or to enable the D2D UE to use the transmitter UE as a relay device.

Figure 7:
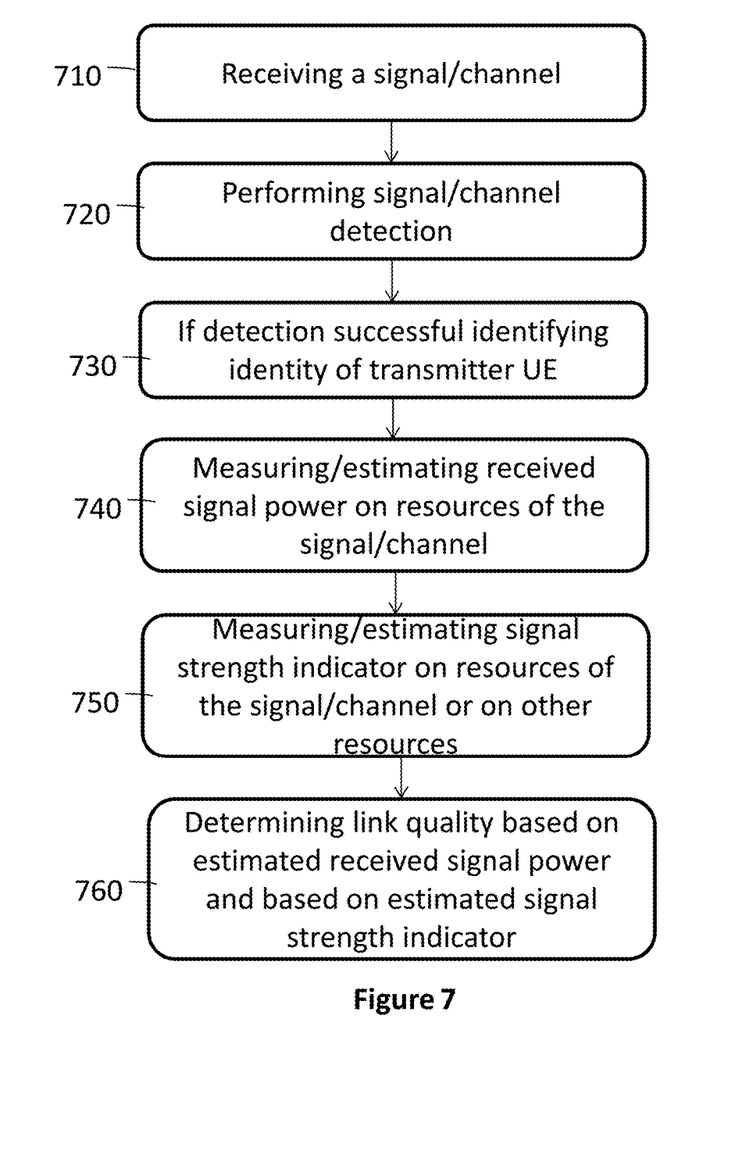
FIG. 7 is a flowchart depicting embodiments of a method performed by the D2D UE.

Referring to FIG. 7 there is illustrated a flowchart of a method performed by a D2D UE (e.g. Device A) according to previously described embodiments.

The method comprising:

(710) receiving a signal/channel;

(720) performing signal/channel detection;

(730) identifying the identity of the transmitter UE if detection is successful; the identity of the transmitter (D2D) UE may be used by the D2D UE (Device A) to transmit dedicated signalling to the transmitter UE or to use the transmitter UE as a relay D2D device;

(740) measuring/estimating a received signal power on resources of the signal/channel e.g. discovery;

(750) measuring/estimating a signal strength indicator on resources of the signal/channel or on other resources. As previously disclosed the signal strength indicator may be measured/estimated on resources associated to the successfully detected signal/channel for a transmitted UE of interest e.g. discovery. The signal strength indicator may instead be measured/estimated on other resources for a signal/channel e.g. data or SA e.g. on other resources that are different from the resources where the received signal power is measured/estimated; and (760) determining a link quality based on the measured/estimated received signal power and also based on the measured/estimated signal strength indicator.

Figure 8:
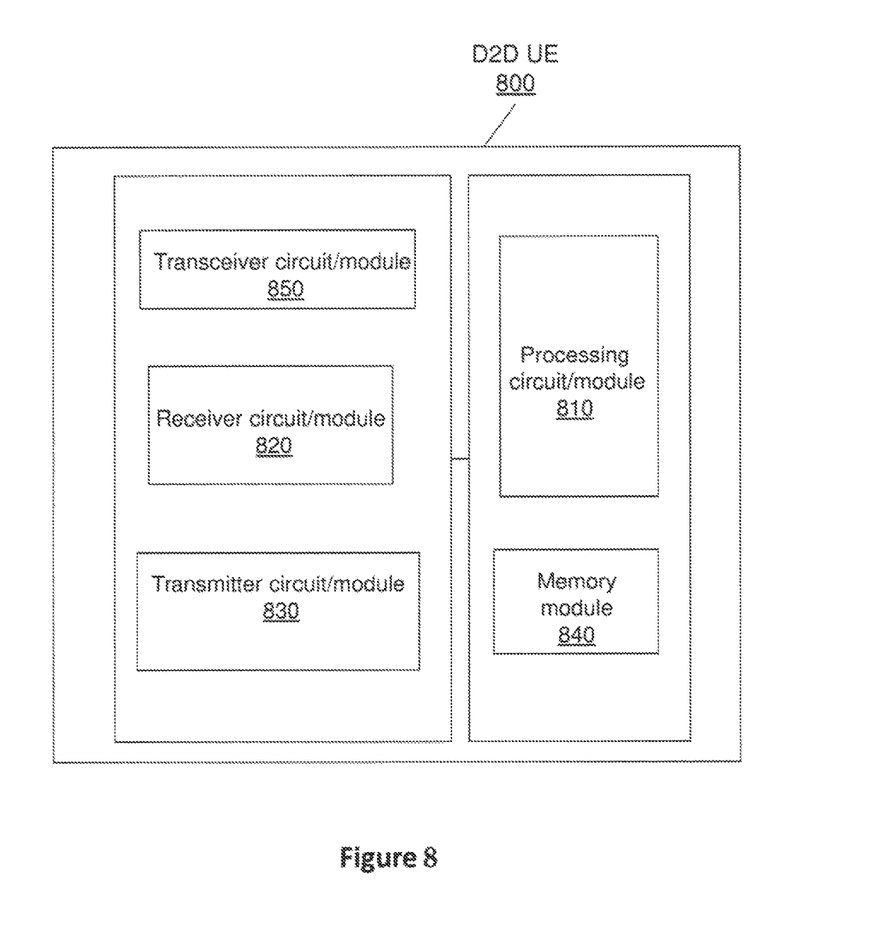
FIG. 8 is a schematic block diagram illustrating embodiments of a D2D UE according to embodiments herein.

To perform the method or procedure steps described above in relation to FIG. 7, a D2D device (UE) 800 comprises the following arrangement depicted in FIG. 8, and as described below.

The D2D UE 800 comprises a processing circuit or a processing module or a processor or means 810, antenna circuitry (not shown); a receiver circuit or receiver module 820; a transmitter circuit or transmitter circuit 830; a memory module 840 and a transceiver circuit or transceiver module 850 which may include the transmitter circuit 830 and the receiver circuit 820.

The D2D UE may be a wireless device e.g. a mobile terminal, wireless terminal, mobile station, mobile telephone, cellular telephone, or a smart phone. Further examples of different wireless devices comprise laptops with wireless capability, Laptop Embedded Equipment (LEE), Laptop Mounted Equipment (LME), USB dongles, Customer Premises Equipment (CPE), modems, Personal Digital Assistants (PDA), or tablet computers, sometimes referred to as a surf plates with wireless capability or simply, tablets, Machine-to-Machine (M2M) capable devices or UEs, Machine Type Communication (MTC) devices such as sensors, e.g., a sensor equipped with UE, just to mention some examples.

The processing module/circuit 810 includes a processor, microprocessor, an application specific integrated circuit (ASIC), field programmable gate array (FPGA), or the like, and may be referred to as the "processor 810." The processor 810 controls the operation of the D2D UE 800 and its components. Memory (circuit or module) 840 includes a random access memory (RAM), a read only memory (ROM), and/or another type of memory to store data and instructions that may be used by processor 810. In general, it will be understood that the D2D UE 800 in one or more embodiments includes fixed or programmed circuitry that is configured to carry out the operations in any of the embodiments disclosed herein.

In at least one such example, the D2D UE 800 includes a microprocessor, microcontroller, DSP, ASIC, FPGA, or other processing circuitry that is configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the D2D UE operations disclosed herein. Further, it will be appreciated that the D2D UE 800 may comprise additional components not shown in FIG. 8.

The receiver module/circuit 820 (also referred to as a receiver 820 or receiver circuit 820) or the transceiver module/circuit 850 (also referred to as a transmitter 850 or transmitter circuit 850) is configured to receive a signal/channel, for example, a D2D discovery signal or a D2D signal or a D2D SA. The processing circuit/module 810 is configured to perform detection of the received signal and is also configured to determine whether or not the detection is successful. This may be done by performing a CRC and if the CRC check is successful, the processing circuit/module 810 is configured to identify the identity of the D2D device (UE) that transmitted the signal/channel.

The processing circuit/module 810 is further configured to measure or estimate a received signal power on resources of the received signal/channel. The processing circuit/module 810 is further configured to measure or estimate a signal strength indicator on resources of the signal/channel or on other resources as explained above. The processing circuit/module 810 is further configured to determine a link quality of the received signal/channel based on the estimated received signal power and also based on estimated signal strength indicator. As previously described the link quality may be determined as link quality=$N_{PRB}$×(estimated received signal power/estimated signal strength indicator), where $N_{PRB}$ is the number of physical resource blocks over the measurement bandwidth used for D2D communication. If the detection is not successful, the D2D UE 800 is configured to refrain from performing the measurements.

The transmitted circuit/module 830 is configured to transmit signals/channels e.g. discovery signals, data signals and/or SA to other D2D UEs.

The memory module 840 may contain instructions executable by the processor 810 whereby the D2D UE 800 is operative to perform the previously described method steps. There is also provided a computer program comprising computer readable code means which when run in the first communication device 800 e.g. by means of the processor 810 causes the D2D UE 800 to perform the above described method steps as disclosed in relation to FIGS. 6-7, which include at least: receiving a signal/channel; performing signal/channel detection; identifying the identity of the transmitter D2D UE if detection is successful (e.g. CRC successful); measuring/estimating a received signal power on resources of the signal/channel e.g. discovery; measuring/estimating a signal strength indicator on resources of the signal/channel or on other resources. As previously disclosed the signal strength indicator may be measured/estimated on resources associated to the successfully detected signal/channel for a transmitter UE of interest e.g. discovery. The signal strength indicator may instead be measured/estimated on other resources for a signal/channel e.g. data or SA e.g. on other resources that are different from the resources where the received signal power is measured/estimated; and determining a link quality based on the measured/estimated received signal power and also based on the measured/estimated signal strength indicator. As previously described the link quality may be determined as link quality=$N_{PRB}$×(estimated received signal power/estimated signal strength indicator), where $N_{PRB}$ is the number of physical resource blocks over the measurement bandwidth used for D2D communication.

If the detection is not successful (e.g. CRC fails), the D2D UE 800 is configured to refrain from performing the measurements.

Additional operations performed by the D2D UE 800 (in related to Device A of FIG. 3) have already been described.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, it should be noted that although terminology from 3GPP LTE has been used in this disclosure to exemplify the invention, this should not be seen as limiting the scope of the invention to only the aforementioned system. Other wireless systems, including LTE-A (or LTE-Advanced), 5G, UMTS, WiMax, and WLAN employing D2D communications may also benefit from exploiting the ideas covered within this disclosure.

The invention claimed is:

1. A method in a Device-to-Device (D2D)-capable User Equipment (UE) for determining a link quality of a D2D signal or channel, the method comprising:
   receiving a discovery signal or channel transmitted from another D2D-capable UE;
   responsive to successful detection of the discovery signal or channel, identifying the other D2D-capable UE and measuring a received signal power on resources of the discovery signal or channel;
   measuring a signal strength indicator only on resources for a scheduling assignment (SA) that exclude the resources of the discovery signal or channel; and
   determining the link quality based on the measured received signal power and based on the measured signal strength indicator.

2. The method according to claim 1, wherein measuring the signal strength indicator comprises measuring the signal strength indicator on resources associated with the successfully detected discovery signal or channel.

3. The method according to claim 1, wherein determining the link quality comprises determining the link quality according to:
   the link quality=$N_{PRB}$×(the measured received signal power/the measured signal strength indicator), where $N_{PRB}$ is a number of physical resource blocks (PRB) over a measurement bandwidth used for D2D communication.

4. The method according to claim 1, wherein measuring the received signal power on the resources of the discovery signal or channel comprises measuring a Reference Signal Receive Power (RSRP) of the discovery signal or channel, and wherein measuring the signal strength indicator on the other resources that are partitioned from the resources of the discovery signal or channel comprises measuring a Received Signal Strength Indicator (RSSI), and wherein determining the link quality based on the measured RSRP and based on the measured RSSI comprises measuring a Reference Signal Received Quality (RSRQ) of the discovery signal or channel.

5. A Device-to-Device (D2D)-capable User Equipment (UE) configured to determine a link quality of a D2D signal or channel, the D2D-capable UE comprising:
- a transceiver circuit configured to receive a discovery signal or channel transmitted from another D2D-capable UE; and
- a processing circuit configured to:
  - responsive to successful detection of the discovery signal or channel, identify the other D2D-capable UE and measure a received signal power on resources of the discovery signal or channel;
  - measure a signal strength indicator only on resources for a scheduling assignment (SA) that exclude the resources of the discovery signal or channel; and
  - determine the link quality based on the measured received signal power and based on the measured signal strength indicator.

6. The D2D-capable UE according to claim 5, wherein the processing circuit is configured to measure the signal strength indicator on resources associated with the successfully detected discovery signal or channel.

7. The D2D-capable UE according to claim 5, wherein the processing circuit is configured to determine the link quality according to:

the link quality=$N_{PRB}$×(the measured received signal power/the measured signal strength indicator), where $N_{PRB}$ is a number of physical resource blocks (PRB) over a measurement bandwidth used for D2D communication.

8. The D2D-capable UE according to claim 5, wherein the measured received signal power is a Reference Signal Receive Power (RSRP) of the discovery signal or channel, and wherein the measured signal strength indicator is a Received Signal Strength Indicator (RSSI), and wherein the link quality is a Reference Signal Received Quality (RSRQ) of the discovery signal or channel.

9. A non-transitory computer-readable storage medium storing a computer program comprising program instructions that, when executed by a processing circuit of a Device-to-Device (D2D)-capable UE, cause the D2D-capable UE to:
- receive a discovery signal or channel transmitted from another D2D-capable UE;
- responsive to successful detection of the discovery signal or channel, identify the other D2D-capable UE and measure a received signal power on resources of the discovery signal or channel;
- measure a signal strength indicator only on resources for a scheduling assignment (SA) that exclude the resources of the discovery signal or channel; and
- determine a link quality of the discovery signal or channel based on the measured received signal power and based on the measured signal strength indicator.

* * * * *